(12) United States Patent
Napolitano

(10) Patent No.: US 8,281,659 B2
(45) Date of Patent: Oct. 9, 2012

(54) METHODS AND APPARATUS FOR VIBRATION TESTING USING MULTIPLE SINE SWEEP EXCITATION

(75) Inventor: Kevin Napolitano, San Diego, CA (US)

(73) Assignee: ATA Engineering, Inc., San Diego, CA (US)

(*) Notice: Subject to any disclaimer, the term of this patent is extended or adjusted under 35 U.S.C. 154(b) by 241 days.

(21) Appl. No.: 12/834,732

(22) Filed: Jul. 12, 2010

(65) Prior Publication Data

US 2011/0146406 A1  Jun. 23, 2011

Related U.S. Application Data

(60) Provisional application No. 61/225,863, filed on Jul. 15, 2009.

(51) Int. Cl.
  *G01N 29/04* (2006.01)
(52) U.S. Cl. ............... 73/579; 73/597; 73/602
(58) Field of Classification Search ............ 73/579, 73/597, 602, 664, 808
  See application file for complete search history.

(56) References Cited

U.S. PATENT DOCUMENTS

| | | | | |
|---|---|---|---|---|
| 4,513,622 A | * | 4/1985 | Uretsky | 73/664 |
| 5,122,970 A | * | 6/1992 | Gilbert et al. | 702/33 |
| 5,299,459 A | * | 4/1994 | Underwood | 73/664 |
| 5,517,426 A | * | 5/1996 | Underwood | 702/109 |
| 5,565,618 A | * | 10/1996 | Hu | 73/1.82 |
| 5,767,406 A | * | 6/1998 | Hu | 73/578 |
| 5,965,816 A | * | 10/1999 | Hu | 73/578 |
| 6,098,465 A | * | 8/2000 | Matsumoto et al. | 73/808 |
| 6,189,385 B1 | * | 2/2001 | Horiuchi et al. | 73/664 |
| 7,030,627 B1 | * | 4/2006 | Ashley | 324/650 |
| 7,134,344 B2 | * | 11/2006 | Kurt-Elli | 73/664 |
| 7,728,576 B1 | * | 6/2010 | Jones et al. | 324/76.77 |
| 7,987,718 B2 | * | 8/2011 | Huber et al. | 73/579 |

* cited by examiner

*Primary Examiner* — J M Saint Surin
(74) *Attorney, Agent, or Firm* — Ingrassia Fisher & Lorenz, P.C.

(57) ABSTRACT

A multi-sine vibration testing method includes coupling a vibratory excitation source and a sensor to a test structure, then providing a reference signal to the excitation source, wherein the reference signal comprises a first sinusoidal waveform having a first frequency and a second sinusoidal waveform having a second frequency different from the first frequency. The first frequency and the second frequency each sweep between a corresponding start value and a corresponding end value, and the frequency response is measured from each of the sensors while providing the reference signal.

20 Claims, 11 Drawing Sheets

METHODS AND APPARATUS FOR VIBRATION TESTING USING MULTIPLE SINE SWEEP EXCITATION

CROSS-REFERENCE TO RELATED APPLICATIONS

The present application claims priority to U.S. Prov. Pat. Appl. No. 61/225,863, filed Jul. 15, 2009, which is hereby incorporated by reference in its entirety.

STATEMENT REGARDING FEDERALLY SPONSORED RESEARCH OR DEVELOPMENT

The inventive subject matter described herein was made with U.S. Government support under U.S. Air Force Research Laboratory contract No. FA9302-07-M-0009. The U.S. Government has certain rights in this inventive subject matter.

TECHNICAL FIELD

Embodiments of the subject matter described herein relate generally to automated testing techniques and, more particularly, to vibration testing of aircraft structures and the like.

BACKGROUND

It is often desirable to employ force excitation methods for ground vibration testing of aircraft and other test structures. The purpose of such testing is to determine the frequency response functions (FRF) of the structure for various excitation points and frequencies. Force-excitation methods include, for example, multi-reference random excitation (e.g., burst random excitation) and sine sweep methods.

Multi-reference random methods are often preferred because the desired frequency response functions (FRF) for all responses and all references can be measured simultaneously, which greatly reduces data collection times. However, random methods are also be undesirable in that the signal-to-noise ratio during testing can be relatively low, leading to unsatisfactory FRF results.

Sinusoidal sweep methods, on the other hand, provide higher RMS input loads and often lead to much cleaner FRF results. Sinusoidal sweep methods, which involve "sweeping" through a range of frequencies, can also used to provide symmetric and antisymmetric excitations to emphasize symmetric and antisymmetric modes, respectively, particularly in aircraft and other structures in which clear symmetry (e.g., reflective symmetry) can be identified. Such sweep tests are undesirable, however, in that they are single-reference and must therefore be run in series, prolonging the overall testing time. For example, if excitation sources (e.g., "shakers") are mounted on each wingtip as well as each horizontal stabilizer, then a total of four sine sweeps are required: wing symmetric, wing antisymmetric, horizontal stabilizer symmetric, and horizontal stabilizer antisymmetric.

To address the latter issue, a number of multiple-reference sinusoidal techniques have been developed. These techniques, however, tend to be based on multi-reference stepped-sine testing in which the number of shaker loading combinations is equal to at least the number of shakers used. Since these loading combinations are applied consecutively and not simultaneously (or concurrently), testing time is not improved.

It is therefore desirable to provide improved ground vibration testing techniques that can quickly and efficiently collect all FRF data simultaneously for a test structure. Other desirable features and characteristics of the present invention will become apparent from the subsequent detailed description and the appended claims, taken in conjunction with the accompanying drawings and the foregoing technical field and background.

BRIEF SUMMARY

A vibration testing method for a test structure having a vibratory excitation source and a sensor coupled thereto generally includes providing a reference signal to the excitation source, wherein the reference signal comprises a first sinusoidal waveform having a first swept frequency and a second sinusoidal waveform having a second swept frequency different from the first frequency, and wherein the first swept frequency and the second swept frequency each sweep between a corresponding start value and a corresponding end value. The frequency response is measured from each of the sensors while providing the reference signal.

A system for performing vibration testing of a test structure generally includes a plurality of excitation sources mechanically coupled to the test structure, each excitation source adapted to receive a reference signal and impart a dynamically changing force to the test structure responsive to the reference signal; a plurality of sensors coupled to the test structure, each sensor adapted to measure a dynamic response of the test structure; and a multi-sine signal generator coupled to the plurality of excitation sources, the multi-sine signal generator configured to produce a plurality of multi-sine signal sweeps, each multi-sine signal sweep corresponding to a selected reference signal, wherein each multi-sine signal sweep includes at least one sinusoidal waveform that sweeps continuously from a start value to an end value, at least one of the multi-sine signal sweeps including two or more sinusoidal waveforms having different start values.

A method of determining a frequency response function of a test structure in accordance with another embodiment generally includes applying force excitation to the test structure, the force excitation including two or more independent sinusoidal waveforms provided simultaneously; continuously modifying the two or more independent sinusoidal waveforms while sensing a dynamic response of the test structure; and determining the frequency response function based on the dynamic response of the test structure.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter described herein relates to vibration test equipment and related operating methods, procedures, and functions. In this regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, many conventional techniques and principles related to imaging, data acquisition, vibration testing, and the like are not described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
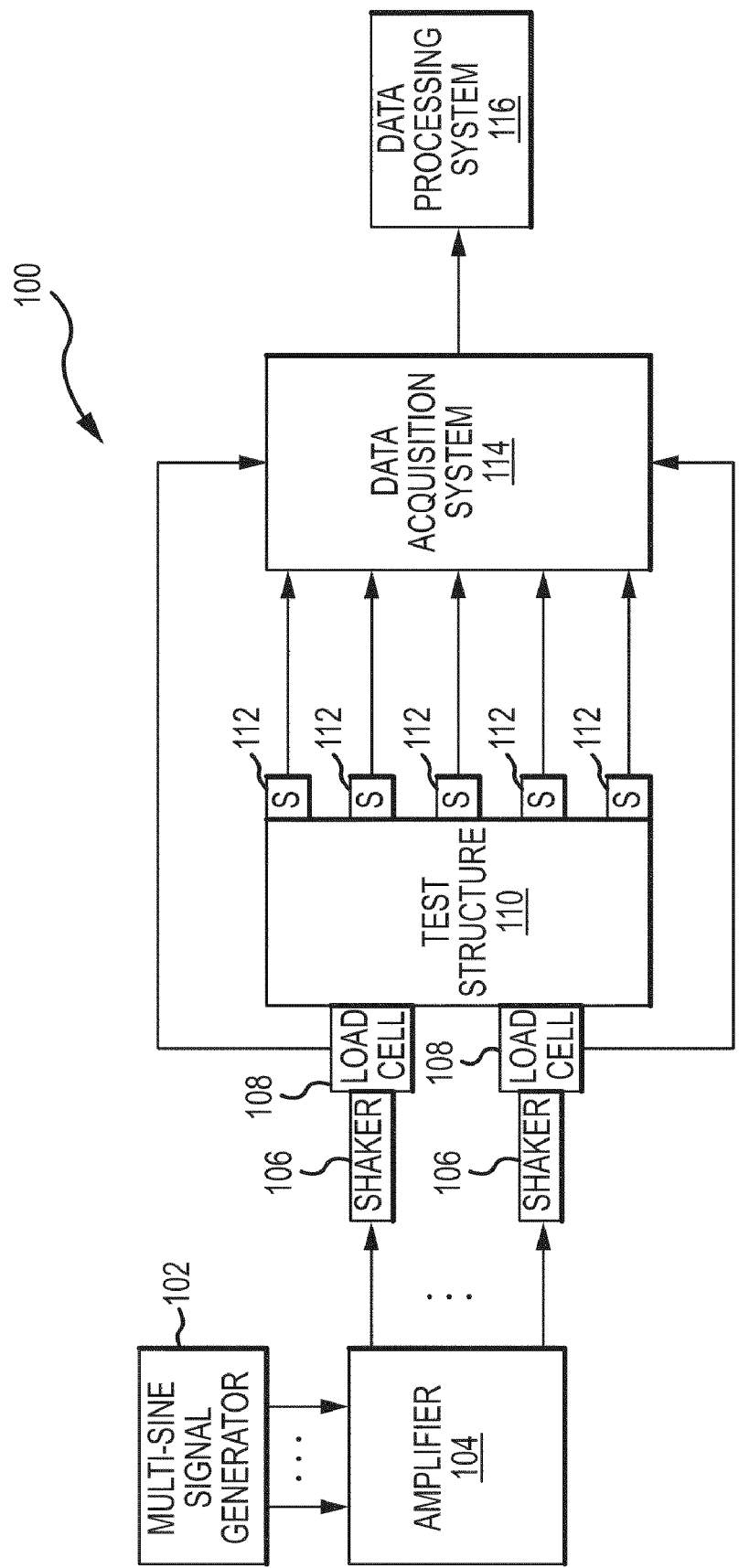
FIG. 1 is a schematic overview of an exemplary test system in accordance with the various embodiments of the invention.

FIG. 1 is a schematic overview of an exemplary test system 100 that generally includes a multi-sine signal generator 102, an amplifier 104 coupled to multi-sine signal generator 102, one or more shakers 106 coupled to amplifier 104, and one or more load cells 108 coupled to shakers 106. Shakers 106 are coupled to a test structure 110 via respective load cells 108. Test system 100 further utilizes a plurality of sensors 112, which may be realized as accelerometers, acoustic sensors, or the like, and which are mechanically coupled to various locations or points on test structure 110.

Test system 100 may also include a data acquisition system 114 that receives test signals or data from load cells 108 and from sensors 112. In certain embodiments, data acquisition system 114 can be coupled to a data processing system 116 that processes digitized data from data acquisition system 114 into a manageable and/or usable format (e.g., printed or displayed reports, charts, graphs, simulations, images, animations, or the like). Data acquisition system 114 may be implemented as any suitable combination of conventional hardware and software components.

The multi-sine signal generator 102 generates one or more reference signals (e.g., unamplified signals) having the qualitative and quantitative characteristics described in more detail below. Amplifier 104 converts the input reference signals into a medium, magnitude, and/or format that can then be used to drive excitation sources (e.g., shakers 106). In this embodiment, for example, amplifier 104 converts the input signal voltages into related drive currents that are then supplied to shakers 106. Thus, the drive currents serve as excitation signals for shakers 106. Depending upon the particular application and test methodology, any number of shakers 106 could be utilized to carry out the vibration testing. In a typical test, test system 100 will utilize between about two and sixteen shakers 106, although any number of shakers 106 may be used.

Shakers 106 are suitably configured to impart a vibrating, pulsating, oscillatory, or other dynamically changing force to test structure 110. In practice, a shaker 106 may be any vibratory excitation source, including a speaker, a transducer, a shaker element, a shake table, a rotating eccentric mass actuator, a piezoelectric actuator, or any other actuation mechanism that can dynamically excite a physical structure.

Each shaker 106 may be associated with (and mechanically coupled to) a respective load cell 108, which is then used to measure the actual excitation signal imparted to the test structure 110. In this regard, the load cells 108 may be considered to be input references for the test system 100. The load cells 108 provide signals or data representing the measured input load to the data acquisition system 114, which processes that information as described in further detail below.

Sensors 112, which are mechanically coupled to test structure 110, measure the manner in which test structure 110 responds to the excitation signals. In practice, there may be tens or hundreds of sensors 112 coupled to various locations on test structure 110 (though for the sake of simplicity only five are shown in FIG. 1). Thus, a typical test system 100 will include many more sensors 112 than shakers 106.

Sensors 112 provide signals or data representing the measured output response to data acquisition system 114, which processes that information in an appropriate manner. In practice, each sensor 112 generates a continuous time output signal that is received by the data acquisition system 114. In turn, the data acquisition system 114 digitizes the continuous time output signals into equivalent digital signals, which can then be processed using conventional digital signal processing techniques. This enables test system 100 to obtain digitized time histories corresponding to the raw output data.

Data acquisition system 114 and/or the data processing system 116 may be used to process the digitized data as needed. As explained in further detail below, the obtained data is processed to obtain frequency domain data, frequency transfer functions, mode shapes, etc. It should be appreciated that data acquisition system 114 need not be implemented as a separate hardware component. In this regard, data acquisition system 114 can be realized as one or more physical or logical elements that function to convert the continuous time history signal into a digital time history record. Accordingly, a respective digitization element could, for example, be embedded into each sensor 112.

In accordance with the present invention, a multi-sine testing scheme is employed. That is, test structure 110 is simultaneously excited by two or more independent sinusoidal signals having different frequencies. These sinusoidal signals are changed continuously such that they "sweep" through a range of frequencies, as described in detail below. That is, each signal has a "swept" frequency that changes continuously over time.

Stated another way, the method includes applying force excitation to test 110 structure, wherein the force excitation including two independent sinusoidal waveforms provided simultaneously. The waveforms are "independent" in that their frequencies, at any point in time, are not equal to each otherwise or otherwise correlated (e.g., not an integer multiple of each other). The two independent sinusoidal waveforms are modified continuously (rather than discretely) while maintaining their independence and while at the same time sensing the dynamic response of test structure 100. The frequency response function is then determined based on the dynamic response of the test structure.

An individual reference signal for one shaker 106 might have multi-sine characteristics, or the combination of multiple drive signals for multiple shakers 106 could together have multi-sine characteristics. In yet another scenario, test system 100 could use one or more "independent" shakers 106 that are driven by respective multi-sine excitation signals along with one or more other "cooperating" shakers 106 that individually need not be driven by respective multi-sine excitation signals (the cooperating shakers 106, however, are driven in a multi-sine manner using a particular combination of excitation signals).

The multi-sine sweep techniques described herein enable the test system 100 to gather a large amount of information in the frequency domain while saving a significant amount of testing time relative to conventional techniques that do not utilize the described multi-sine approach. That is, in contrast to the multi-sine approach described here, a traditional vibration sweep test might employ two shakers 106 that can be driven symmetrically or asymmetrically. For a symmetric test, the conventional test methodology drives both shakers 106 in phase with the same sine sweep excitation signal. Thus, both shakers are driven with the same frequencies over time. For an asymmetric test, the conventional methodology drives two shakers 106 out of phase (by 180 degrees) with the same sine sweep excitation signal. Thus, both shakers 106 are still being driven with the same frequencies over time, and are therefore always correlated and coherent.

The multi-sine sweep techniques described herein, however, allow test system 100 to sweep through different frequencies simultaneously. Further, the excitation signals driving each shaker 106 need not be the same (and need not be simply out of phase with each other). Thus, the different frequencies are not always correlated and coherent, and the overall testing time can be compressed while still obtaining all desired frequency response data. In this way, multi-sine excitation is used to achieve the speed of burst random excitation while maintaining the data quality and signal-to-noise ratio of sine sweep excitation. Indeed, in some embodiments, test system 100 can complete all sweep excitation, both symmetric and antisymmetric, for all reference points in only one or two runs.

Figure 2:
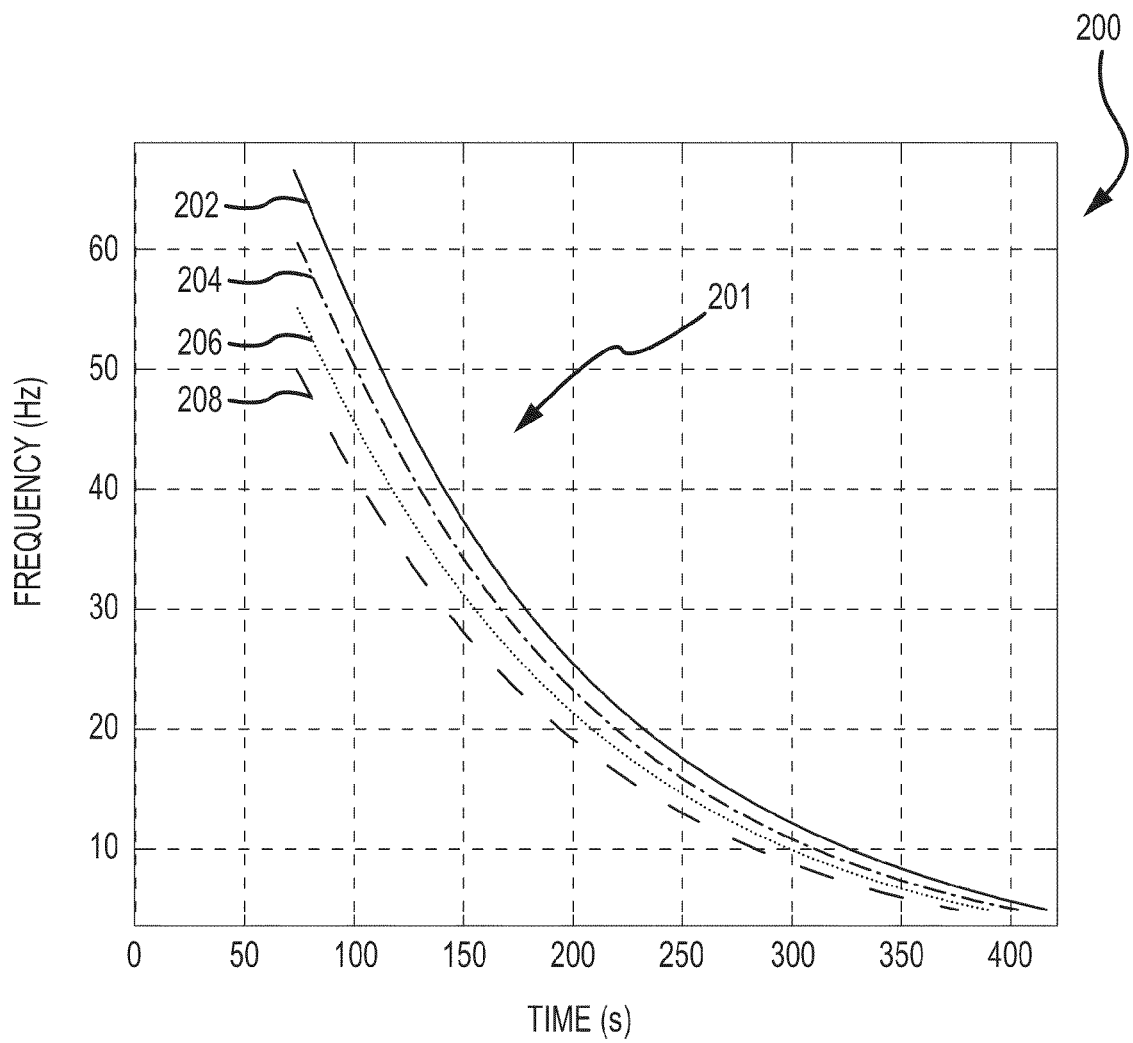
FIG. 2 is a graph depicting multiple sine sweeps in accordance with an exemplary embodiment of the invention.

Referring now to FIG. 2 in conjunction with FIG. 1, an example "waterfall plot" 200 depicts four reference signals (or "sweeps") 201 (i.e., sweeps 202, 204, 206, and 208), each corresponding to a sinusoidal excitation signal that changes in frequency continuously from a start value to an end value. Moreover, the plurality of different reference signals sweep in a simultaneous manner. Accordingly, at any given point in time, the instantaneous frequencies of the sweeps are different. Each sweep 201 may trace any desired continuous curve (e.g., linear, logarithmic, exponential, polynomial, etc.) in any desired direction (low-to-high or high-to-low). The relationship between each sweep 201 may likewise be specified over the length of each sweep (e.g., constant, linear, ratio-based, etc.). For example, in FIG. 2 each sweep 201 is initially separated from its neighbor by approximately 5 Hz, reducing to a difference of about 1 Hz at about 350 seconds in a generally logarithmic fashion.

Since each reference signal 201 is at a different frequency at any particular time, conventional order tracking techniques can be used to extract the structural response for each input and then combine them to reproduce the desired sine sweep frequency response functions (FRFs). Further, the independent reference signals 201 can be added or subtracted to create the desired excitation signals for each shaker 106, including symmetric and antisymmetric structure excitations. The number of resulting independent FRF references is then equal to the lesser of: (1) the number of independent sweeps 202, 204, 206, and 208, and (2) the number of shakers 106. The maximum allowed force for a given shaker 106 depends on its load capacity and the number of independent reference signals 201 that are combined and fed into it. For example, if four independent reference signals are injected into one shaker 106, then the maximum load of any single sweep will be one-fourth of the shaker's capacity.

Figure 5:
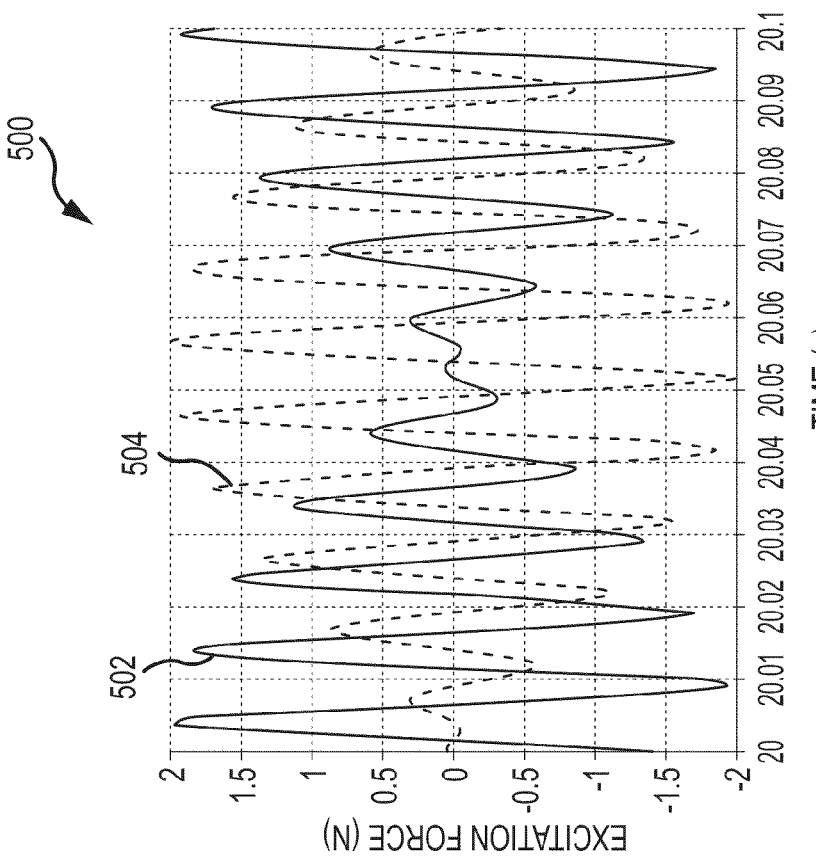
FIGS. 4 and 5 depict symmetrical and antisymmetrical waveforms in accordance with one embodiment.
Figure 4:
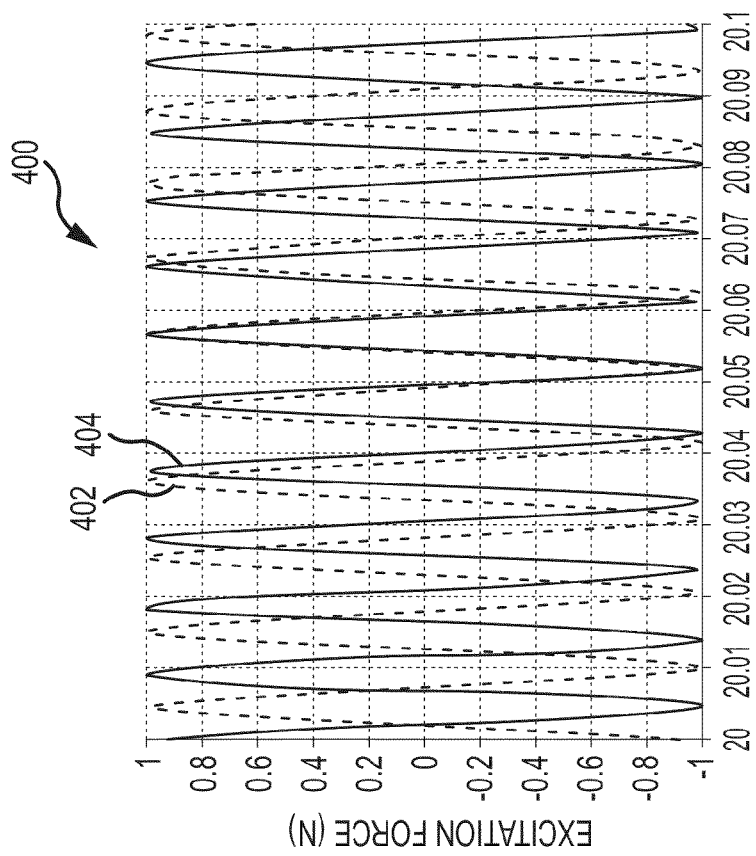

Reference signals 201 can be provided to shakers 106 in a variety of ways, depending on applicable testing objectives. In the simplest form, for example, each reference signal 201 can be provided to a single corresponding shaker 106. Alternatively, reference signals 201 can be mathematically combined, for example, by adding them together or subtracting them from each other, and then provided to shakers 106 to produce a combination of symmetric and/or antisymmetric excitations. FIGS. 4 and 5, for instance, show exemplary reference signals (plotted as excitation force vs. time) useful in visualizing symmetrical and antisymmetrical sweeps in a time domain. In plot 400 of FIG. 4, curve 402 depicts a symmetrical sweep, while curve 404 is a corresponding anti-symmetrical sweep. In plot 500 of FIG. 5, these two sweeps are added in two different ways—i.e., curve 504 results from the addition of curves 402 and 404, and curve 502 results from subtracting curve 404 from curve 402.

Figure 3:
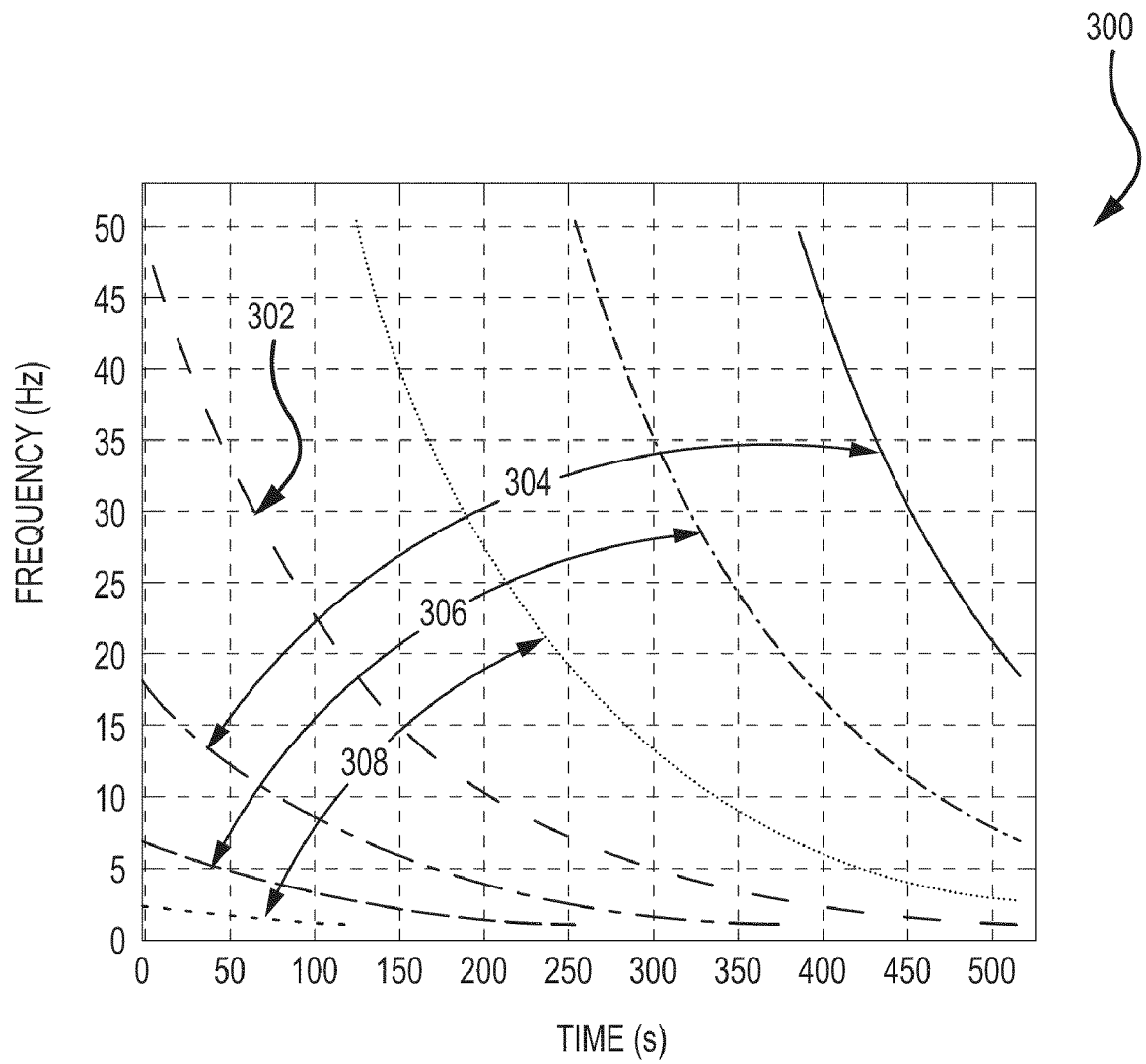
FIG. 3 is a graph depicting the wrapping of sine sweeps in accordance with one embodiment of the invention.

The reference signals, however they are assembled, can also be applied to shakers 106 using an approach called "wrapping." In this technique, testing time can be minimized and the block size can be maximized by performing wrapped sweeps wherein the frequency difference between each neighboring reference signal 201 is maximized over the full frequency range of the test. As an example, with two reference sources, the system may begin at the maximum frequency for the source and then sweep to the minimum frequency for that source, while the other source starts at the mid-span frequency, sweeps to the minimum frequency, and then wraps back to the maximum frequency. FIG. 3 depicts a waterfall plot 300 comparable to plot 200 of FIG. 2, in which certain sweeps are wrapped in this fashion. That is, wrapping occurs between sweep pair 304, sweep pair 306, and sweep pair 308, to which is added a single sweep 302. It will be appreciated that the invention is not so limited, and comprehends that any number of sweeps may be combined in a variety of ways.

Figure 6:
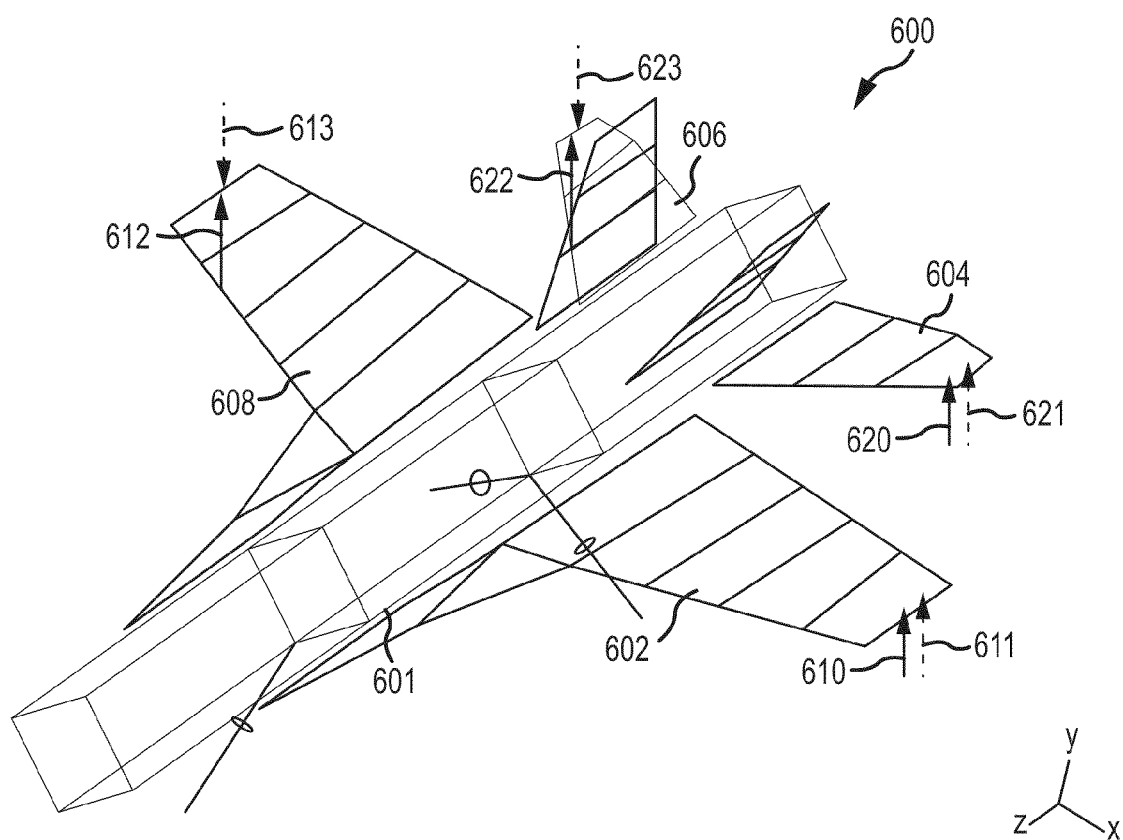
FIG. 6 depicts an aircraft-like test structure in accordance with an exemplary embodiment.

FIG. 6 presents a conceptual, isometric overview of a prototype aircraft structure (or simply "structure") 600 corresponding to the test structure 110 of FIG. 1, and useful in describing certain tests performed in connection with the present invention. Structure 600 is generally adapted to simulate the dynamics and form factor of a fighter jet, and includes a body 602, a right wing 608, a left wing 602, a right horizontal stabilizer 606, and a left horizontal stabilizer 604. In this experimental setup, four electrodynamic shakers are used, one at each wing tip (i.e., suitably distal ends of wings 602 and 608) and one at each horizontal stabilizer tip (i.e., suitably distal ends of horizontal stabilizers 606 and 604).

For the purposes of clarity, the shakers themselves are not illustrated in FIG. 5, but rather symmetric and antisymmetric forcing patterns resulting from the action of the shakers are depicted as dashed or solid arrows. More particularly, arrows 610 and 612 together depict a symmetrical forcing pattern with respect to wings 602 and 608, while arrows 611 and 613 together depict an antisymmetrical forcing pattern. Similarly, arrows 620 and 622 together depict a symmetrical forcing pattern with respect to horizontal stabilizers 604 and 606, and arrows 621 and 623 together depict an antisymmetrical forcing pattern. It will be appreciated that the locations of respective arrows in this figure in no way limit the range of possible shaker locations.

With continued reference to test structure 600 of FIG. 6, proof-of-concept testing was performed using six shaker excitation methods designated as follows: (a) conventional sine sweep test, (b) conventional burst random test, (c) multi-sine case 1, (d) multi-sine case 2, (e) multi-sine case 3, and (f) multi-sine case 4. Each of these excitation methods will be described in turn.

In the conventional sine sweep test, four separate wing symmetric, wing antisymmetric, horizontal tail symmetric, and horizontal tail antisymmetric sweeps were performed from 50 Hz to 1 Hz. Because in this case there was only one independent source signal per sweep, only one of the load cells (108 in FIG. 1) could be used as a reference signal for calculating FRFs. In the conventional burst random test, all four shakers were excited simultaneously with independent burst random reference signals, and all four shaker load cells were used as FRF references.

In multi-sine case 1, symmetric, then antisymmetric ratio sweeps were performed. Two tests were run with one reference signal provided to each shaker for each test. In the first test, symmetric excitation was applied to wings 602, 608 and horizontal stabilizers 604, 606. In the second test, an antisymmetric excitation was applied to wings 602, 608 and horizontal stabilizers 604, 606. The frequency ratios between the reference signals was set at 1.1 (i.e., each reference signal has a frequency 10% higher than reference signal below it). Since in this scenario there were two independent source signals for each test, two load cells, on the left wingtip and the left horizontal stabilizer, were used as references for FRF.

In multi-sine case 2, a coupled four-shaker ratio sweep was performed. That is, four sources were used, with each adjacent frequency sweep being separated by a ratio of 1.1. The shakers were configured to perform all four conventional sine sweep tests described above (test (a)) simultaneously. In this case, all four load cells could be used as reference signals for FRF.

In multi-sine case 3, the same setup was used as in multi-sine case 2, but with source signals initially spread out over the entire frequency range. As the frequency of a given source signal reaches a limit, it is reset to the opposite frequency limit. Again, as there were four independent sources, all four load cells could be used as references for FRF. Similarly, in multi-sine case 4, each shaker was provided with only one source signal, and all four load cells were used as references FRF.

The particular reference signals, sine sweeps, and combinations thereof used in the aforementioned tests can be specified via the multi-sine signal generator 102 of FIG. 1 using any conventional user interface (e.g., a graphical user interface as is commonly known). Once the desired reference signals and combinations are defined, they are then suitable fed into the shakers (106 in FIG. 1) and data is collected (e.g., via data acquisition system 114 of FIG. 1). Standard signal processing techniques can then be used (via data processing system 116) to generate frequency response functions. In this case, standard multi-reference signal processing was used to construct the frequency response functions in accordance with known techniques. In the described tests, for example, the time histories were processed and overlapped (75%) with a Hanning window to produce the desired FRF characteristics. Neither overlapping nor windowing was applied to the burst random data.

Test results are presented in FIGS. 7 and 10-15 using summary plots generated by the complex mode indicator function (CMIF). The CMIF is a summary plot of the measured frequency response functions, and is calculated by taking the singular value decomposition of the frequency response function matrix. The primary CMIF corresponds to the sum of the square of all measured FRFs.

Comparisons between FRFs collected through sine sweeps and those collected through random excitation methods were made by first postmultiplying the FRF generated during the tests by a force pattern to simulate the sine sweep excitation using the following equation:

$$\{H_{ME}(\omega)\}=[H(\omega)]\{F_P\}$$

where $\{H_{ME}(\omega)\}$ is the "mode enhanced" FRF simulating the sine sweep, $\{H(\omega)\}$ is the FRF matrix, and $\{F_P\}$ is a vector of force patterns that simulate the sweep input forces at each shaker.

For example, in the case where a symmetric sine sweep is performed, the test can be modeled by adding together the FRF from each wingtip (i.e., tips of wings 602 and 608). In this case, the rows in $\{F_P\}$ corresponding to the wingtip shakers were equal to one, and all other entries (such as shakers connected to horizontal stabilizers 604 and 606) were equal to zero.

Figure 7:
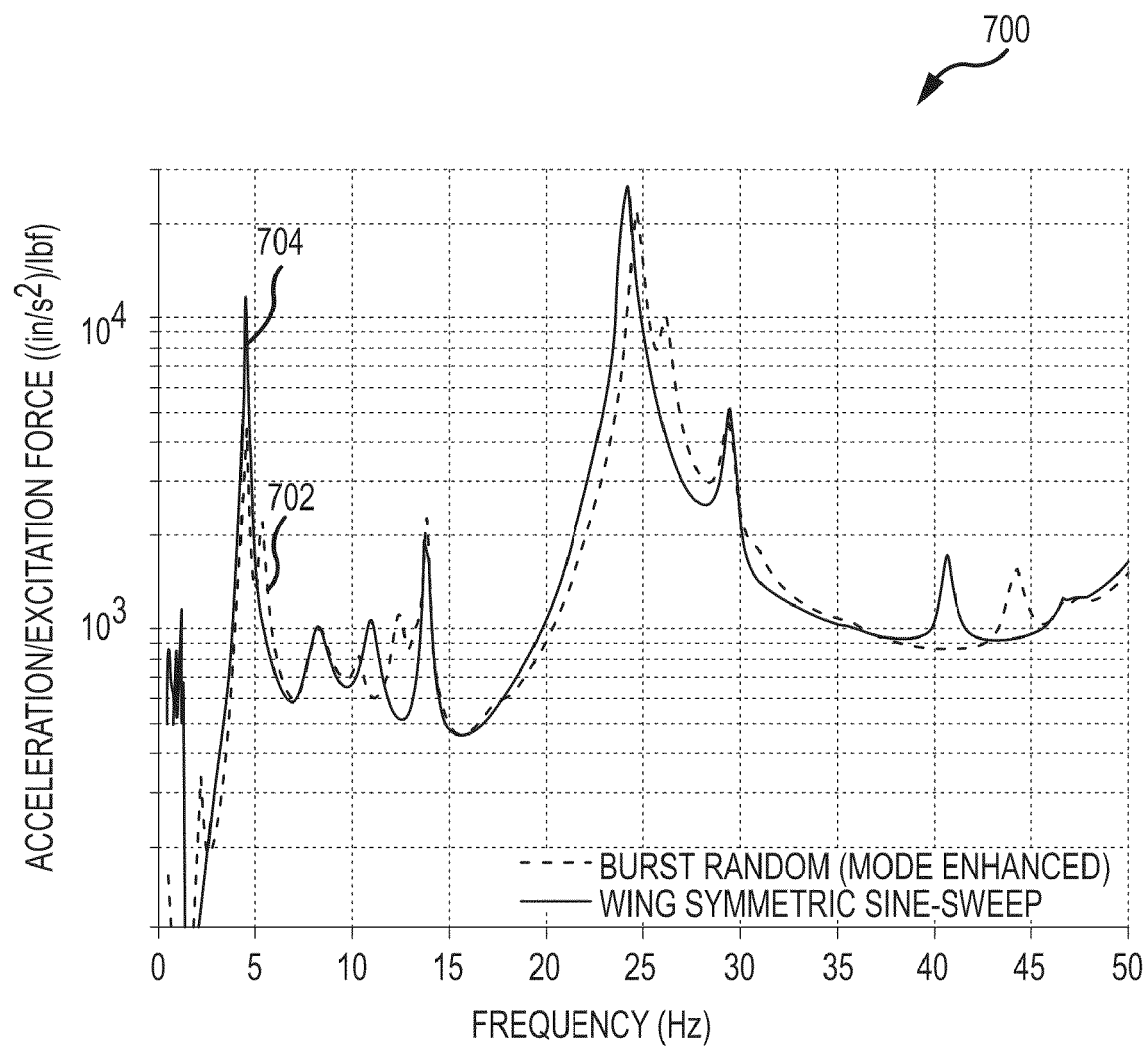
FIG. 7 is a graph showing the frequency response functions (FRFs) for various test conditions.
Figure 9:
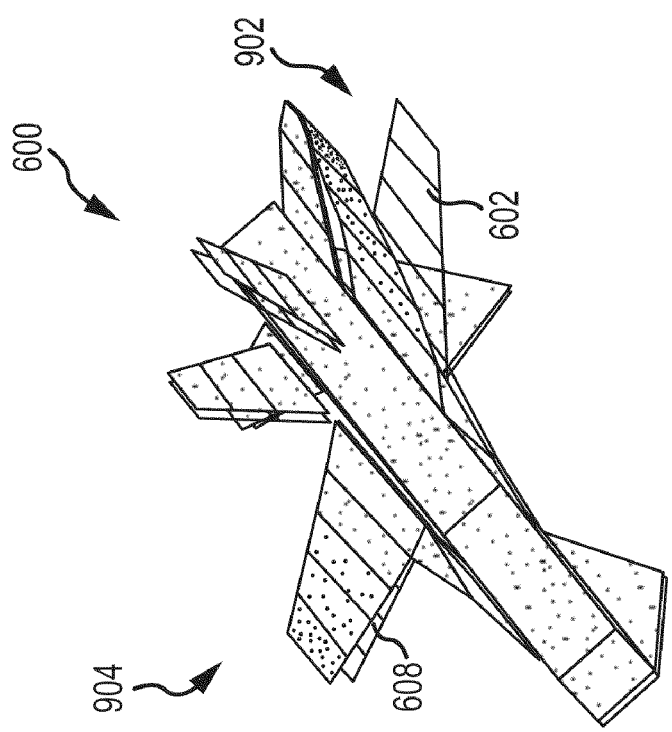
FIGS. 8 and 9 depict mode shapes extracted from a single reference sinusoidal sweep and multi-reference random excitation.
Figure 8:
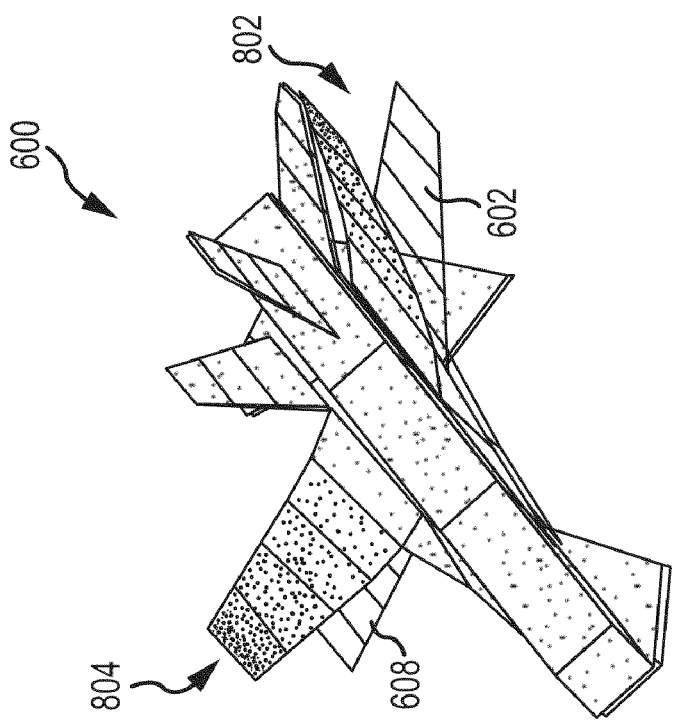

During testing, structure 600 of FIG. 6 was excited in the frequency range of 0.8-50 Hz, which excited all rigid body modes and approximately fifteen flexible structure modes. FIG. 7 presents the CMIF results for the symmetric sine sweep excitation (704) and the CMIF for the mode-enhanced burst random test results (702). As can be seen, the two plots differ from each. The symmetric excitation "forces" the aircraft into a symmetric wing bending mode while the burst random test allows the structure to deform into its natural modes of vibration. As verification, modes extracted for both cases are illustrated isometrically in FIGS. 8 and 9. The symmetric wing bending mode in FIG. 8 (bending deformation 802 and 804) corresponds to the symmetric sweep excitation test, and the left wing bending mode in FIG. 9 (bending deformation 902 and 904) corresponds to the burst random excitation.

The difference in plots described above is often seen in ground vibration tests and can be explained by comparing the force input levels of the sine sweep, which are shown in FIGS. 9-12. The first plot (FIG. 10) shows the driving point frequency response function for the left wingtip shaker for both the symmetric sweep (1002) and the burst random excitations (1004). As expected, the symmetric sweep emphasized symmetric wingtip motion while de-emphasizing antisymmetric wingtip motion.

Figure 11:
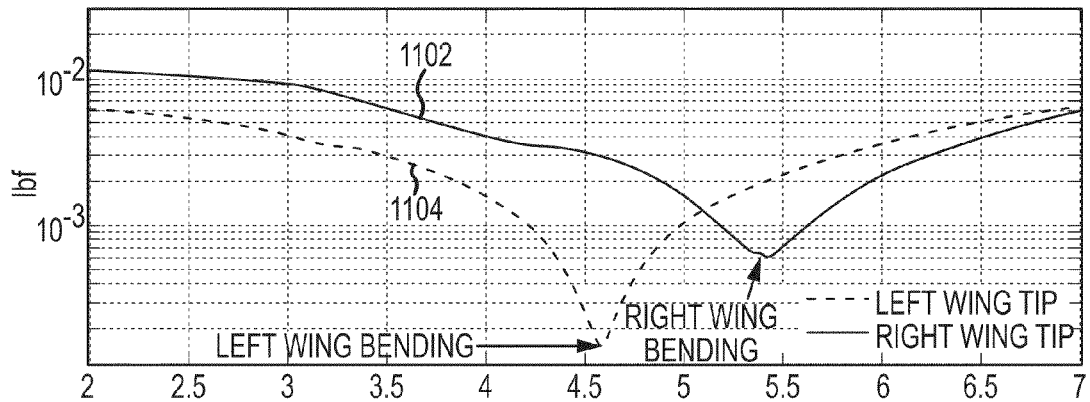
Figure 12:
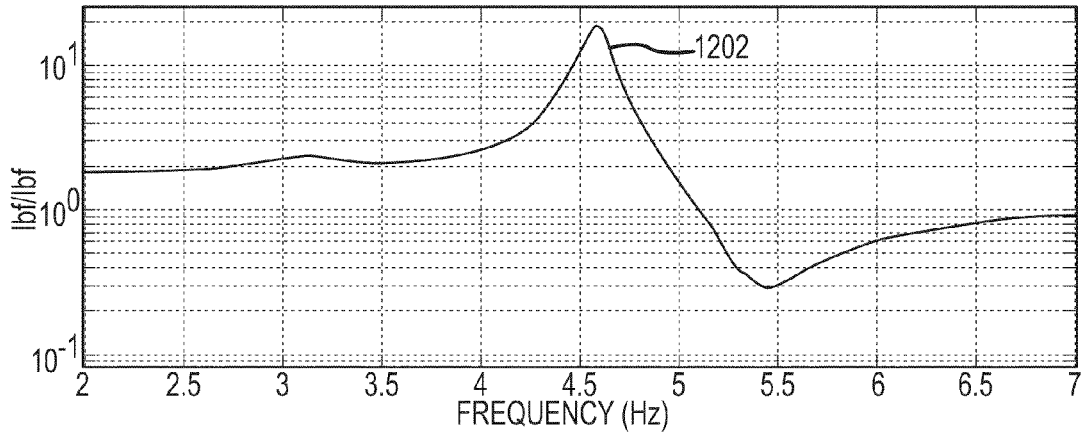
Figure 13:
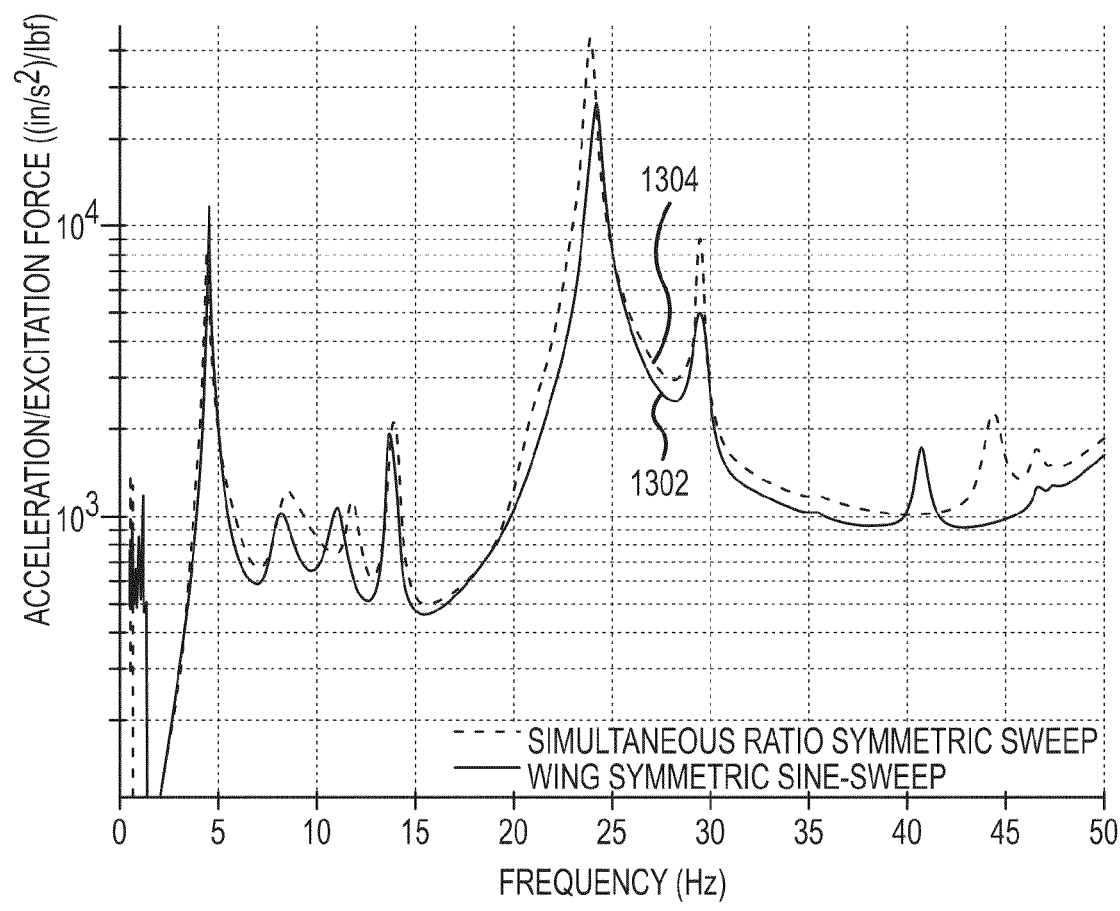
Figure 14:
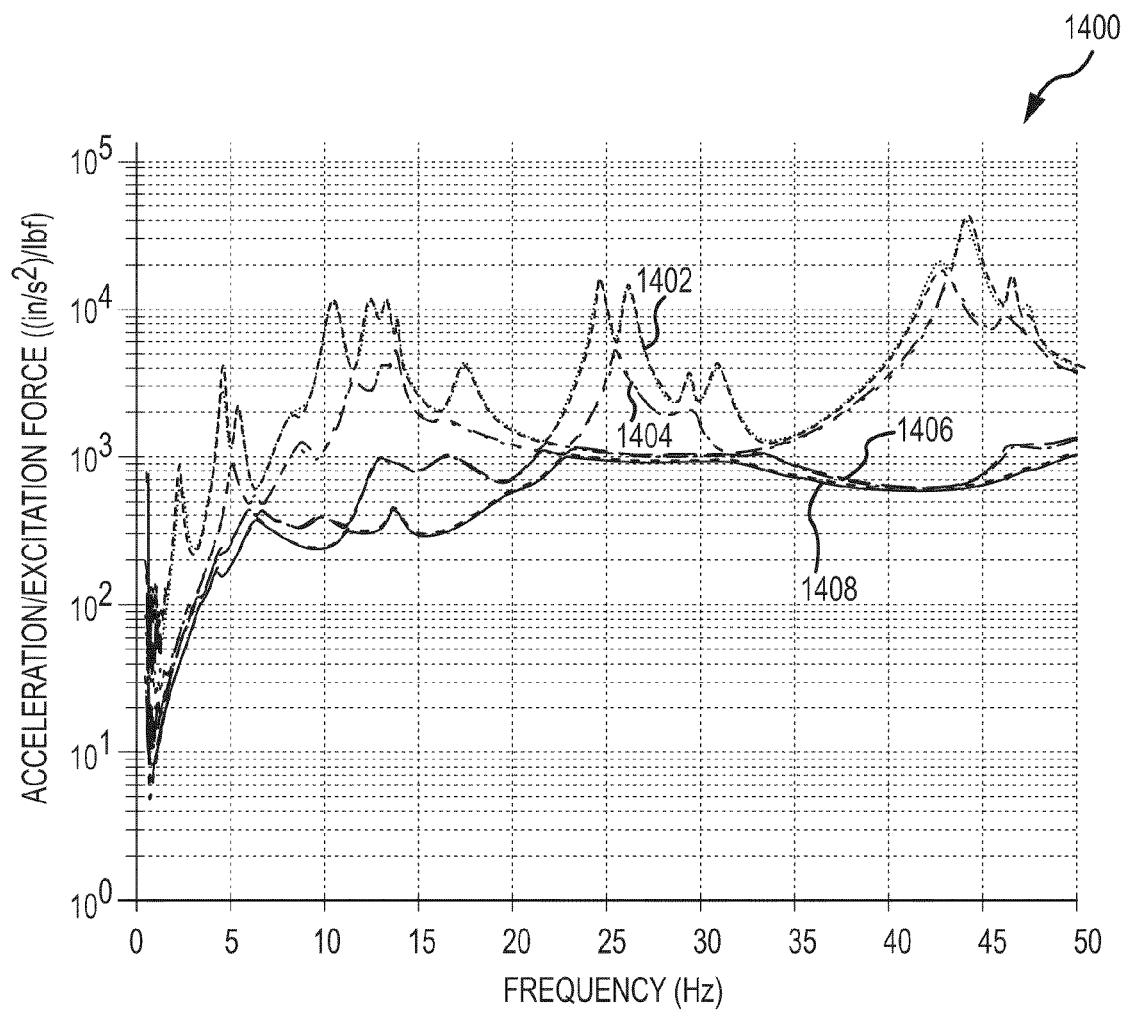

In FIG. 11, the linear spectrum of the left and right wingtip load cells for the symmetric sine sweep case is shown. Plot 1102 corresponds to right wing bending, and plot 1104 corresponds to left wing bending. It can be seen that the force input decreases significantly for each wingtip shaker when passing through their respective wingtip modes. Plot 1202 in FIG. 12 shows the transfer function between the left wingtip shaker load and the right wingtip shaker load of the aforementioned tests.

Figure 10:
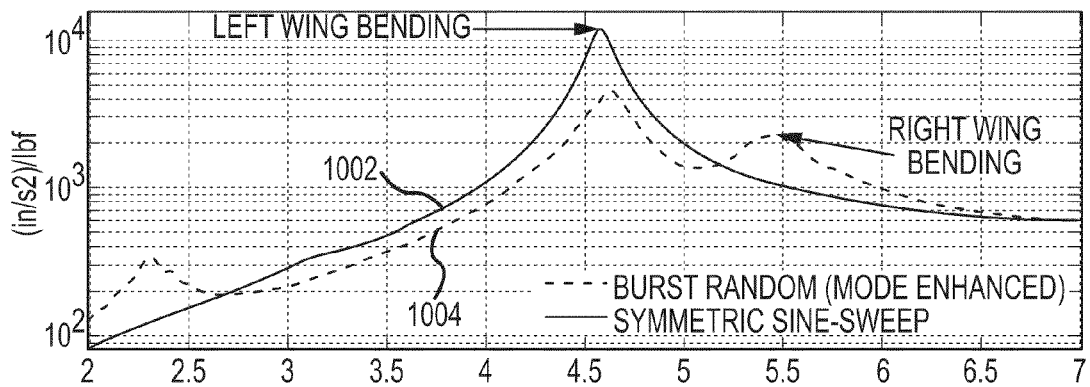
FIGS. 10-15 depict FRFs for various test conditions.

Considering the left wingtip shaker mode alone in FIGS. 10-11, it can be seen that the load applied to the right wing tip is much greater. This occurs because the left wingtip is in resonance and provides little or no resistance to the shaker. As is known in the art, the motion of the shaker head is limited by the resistance of the shaker flexure itself, and in fact, the overall motion of each shaker is the same at the resonant frequency, which leads to the symmetric mode shape.

Comparison of FRF results from symmetric sine sweep case 1 with those of multi-sine case 3 showed fairly consistent behavior. These results are presented in FIG. 13, wherein plot 1302 corresponds to sine sweep case 1, and plot 1304 corresponds to sine sweep case 3 (simultaneous, ratio-symmetric sweep). In both of the illustrated cases, the left wingtip load cell was used as the reference signal, and the right load cell was not used. Therefore, in both cases, the calculated FRFs emphasized symmetric modes and de-emphasized antisymmetric modes. The overlays of the CMIF functions indicate favorable results.

Next, a comparison was made between the conventional burst random test and multi-sine case 6, where each shaker was provided with one independent source signal. The results 1400 are presented in FIG. 14. Since there were four independent sources, four CMIF functions (1402, 1404, 1406, and 1408) are generated for each test run. Each of these curves corresponds to a singular value of the frequency response function matrix. As can be seen, there is excellent agreement down to the fourth CMIF function. This gives further indication that any differences in the sine sweep cases are due to variations in shaker loading.

Figure 15:
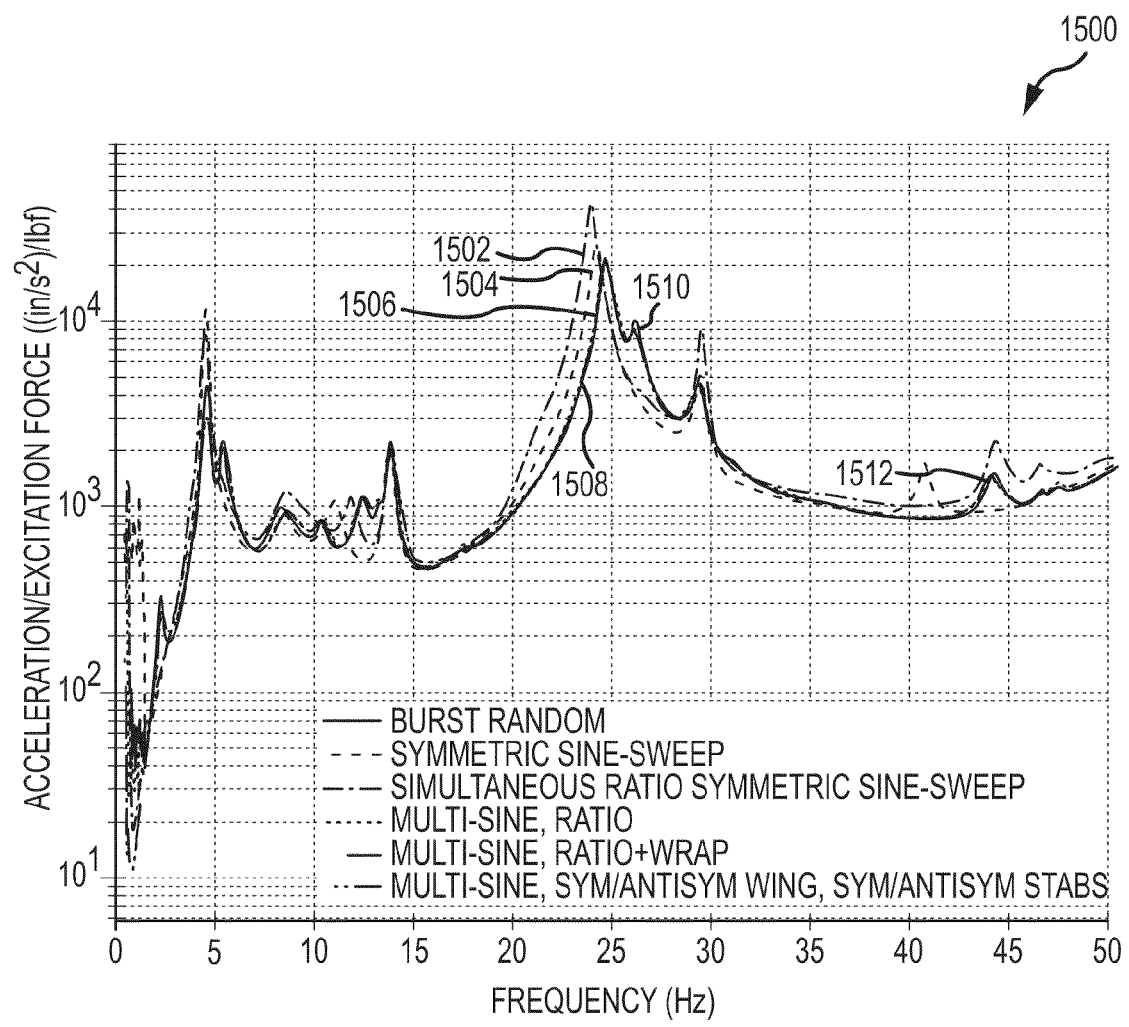

Finally, FIG. 15 compares mode-enhanced FRF that emphasizes symmetric wing bending using conventional excitations and various multi-sine excitation schemes. There is excellent agreement between the conventional tests and the multi-sine tests. All of the four-reference cases: multi-sine ratio (1508), multi-sine ratio with wrap (1510), multi-sine symmetrical/antisymmetrical wings with symmetrical/antisymmetrical stabilizers (1502), are able to generate true properly-scaled FRF and follow the mode-enhanced results of the conventional burst random test (1506). The two-reference methods, multi-sine symmetrical and simultaneous ratio symmetric sine-sweep (1504, 1512), follow the conventional sine sweep tests.

In accordance with the multi-sine method described above, there is a maximum frequency resolution due to the beating nature of the test data when the source signals are combined. As a result, there is a signal-processing issue that should be avoided in practical embodiments: namely, the spectrum may contain significant noise as the block size increases. The effect on the auto spectrum occurs because of the beating effect on the shaker signal as a function of time. This beating frequency occurs as two source signals are added together and subtracted from each other. The overall peak in one curve is maximized when the other is minimized. At an instantaneous point in time, the output spectrum from one of the signals is zero and the other is maximized. If the frequency bin (size) is small enough, or conversely if the frame size is large enough, then this instantaneous value will be evident in the measured auto spectrum. If the frequency bin is larger, then the average value of the auto spectrum is measured and the auto spectrum is smooth.

The user has three choices to reduce the regularized noise in the frequency domain data: (1) decrease block size, (2) decrease sweep rate, or (3) maximize the frequency difference between the source signals. One way to determine whether or not the frame size is small enough is to calculate the cross spectrum between source signals before the test begins. If the cross spectrum between the source signals is comparable to the auto spectrum, then the number of frames should be reduced.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of performing vibration testing of a test structure having a plurality of vibratory excitation sources and a sensor coupled thereto, the method comprising:
   providing respective reference signals to the plurality of vibratory excitation sources to impart respective dynamically changing forces to the test structure, the respective reference signals comprising a first sinusoidal waveform having a first swept frequency and a second sinusoidal waveform having a second swept frequency different from the first swept frequency, wherein the first swept frequency and the second swept frequency each sweep between a corresponding start value and a corresponding end value, and wherein the respective dynamically changing forces are mathematically independent; and
   measuring a frequency response function from the sensor while providing the respective reference signals.

2. The method of claim 1, wherein the first swept frequency and the second swept frequency sweep logarithmically.

3. The method of claim 1, wherein the ratio of the first frequency to the second frequency is substantially constant.

4. The method of claim 1, further comprising:
   coupling a second vibratory excitation source to the test structure; and
   providing a second reference signal to the second vibratory excitation source, the second reference signal comprising a third sinusoidal waveform having a third swept frequency different from the first swept frequency and the second swept frequency, wherein the third swept frequency sweeps between a corresponding start value and a corresponding end value.

5. The method of claim 4, wherein the first reference signal and the third reference signal are antisymmetrical.

6. A method of performing vibration testing of a test structure having a vibratory excitation source and a sensor coupled thereto, the method comprising:
   providing a reference signal to the vibratory excitation source, the reference signal comprising a first sinusoidal waveform having a first swept frequency and a second sinusoidal waveform having a second swept frequency different from the first swept frequency, wherein the first swept frequency and the second swept frequency each sweep between a corresponding start value and a corresponding end value; and
   measuring a frequency response function from the sensor while providing the reference signal,
   coupling a second excitation source to the test structure; and
   providing a second reference signal to the second excitation source, the second reference signal comprising a third sinusoidal waveform having a third swept frequency different from the first swept frequency and the second swept frequency, wherein the third swept frequency sweeps between a corresponding start value and a corresponding end value,
   wherein the start value of the first swept frequency is a maximum value of a range of the first swept frequency, and wherein the start value of the third swept frequency is approximately a mid-span value of a range of the third swept frequency.

7. A system for performing vibration testing of a test structure, the system comprising:
   a plurality of excitation sources mechanically coupled to the test structure, each excitation source adapted to receive a respective reference signal and impart a respective dynamically changing force to the test structure responsive to the respective reference signal, wherein the respective dynamically changing forces are mathematically independent;

a plurality of sensors coupled to the test structure, each sensor adapted to measure a respective dynamic response of the test structure; and a multi-sine signal generator coupled to the plurality of excitation sources, the multi-sine signal generator configured to produce a plurality of multi-sine signal sweeps, each multi-sine signal sweep corresponding to one or more of the reference signals, and wherein at least one of the respective reference signals includes two or more sinusoidal waveforms having substantially independent frequency characteristics.

8. The system of claim 7, wherein the plurality of sensors comprise a plurality of accelerometers.

9. The system of claim 7, wherein the plurality of excitation sources includes a plurality of shakers.

10. The system of claim 7, wherein the plurality of multi-sine signal sweeps vary logarithmically over time.

11. The system of claim 7, wherein the reference signals are selectably configured as antisymmetrical or symmetrical with respect to the excitation sources and test structure.

12. The system of claim 7, wherein the test structure is an aircraft structure, and wherein the plurality of excitation sources include at least wing excitation sources.

13. A method of determining a frequency response function of a test structure, comprising:
    applying a plurality of mathematically independent force excitations to the test structure at a respective plurality of distinct locations on the test structure, the force excitations each including two independent sinusoidal waveforms provided simultaneously;
    continuously modifying the two independent sinusoidal waveforms while sensing a dynamic response of the test structure; and
    determining the frequency response function based on the dynamic response of the test structure.

14. The method of claim 13, wherein continuously modifying the two independent sinusoidal waveforms includes sweeping the two independent sinusoidal waveforms between respective start and end frequency values such that the two independent sinusoidal waveforms remain independent.

15. The method of claim 14, wherein the two independent sinusoidal waveforms are modified logarithmically as a function of time.

16. The method of claim 15, wherein the two independent sinusoidal waveforms have a frequency ratio that remains constant while sweeping between their respective start and end values.

17. A method of determining a frequency response function of a test structure, comprising:
    applying force excitation to the test structure, the force excitation including two independent sinusoidal waveforms provided simultaneously;
    continuously modifying the two independent sinusoidal waveforms while sensing a dynamic response of the test structure; and
    determining the frequency response function based on the dynamic response of the test structure;
    wherein continuously modifying the two independent sinusoidal waveforms includes sweeping the two independent sinusoidal waveforms between respective start and end frequency values such that the two independent sinusoidal waveforms remain independent; and
    wherein each of the two independent sinusoidal waveforms has a frequency range during the sweeping, and wherein the start frequency of at least one of the two independent sinusoidal waveforms lies substantially at the midpoint of its respective range.

18. The method of claim 13, further including selectably applying the force excitation symmetrically or antisymmetrically with respect to the test structure.

19. The method of claim 13, wherein the force excitation is applied via a single excitation source comprising the two independent sinusoidal waveforms.

20. The method of claim 13, wherein the force excitation is applied via two excitation sources, each corresponding to a respective one of the two independent sinusoidal waveforms.

* * * * *